(12) United States Patent
Davis, Jr. et al.

(10) Patent No.: US 6,695,674 B1
(45) Date of Patent: Feb. 24, 2004

(54) GAME CALL FRICTION MATERIAL

(75) Inventors: James Davis, Jr., Dover, AR (US); JoAnne Davis, Dover, AR (US)

(73) Assignee: Penline Production LLC, Dover, AR (US)

( * ) Notice: Subject to any disclaimer, the term of this patent is extended or adjusted under 35 U.S.C. 154(b) by 0 days.

(21) Appl. No.: 10/385,548

(22) Filed: Mar. 11, 2003

(51) Int. Cl.[7] ................................................. A63H 5/00
(52) U.S. Cl. .............................. 446/418; 446/397; 43/2
(58) Field of Search .............................. 446/418, 397, 446/176, 180; 43/2, 3

(56) References Cited

U.S. PATENT DOCUMENTS

| | | | |
|---|---|---|---|
| 574,534 A | 1/1897 | Gibson et al. | |
| 2,643,483 A | * 6/1953 | Walker | ........................ 446/397 |
| 3,367,064 A | * 2/1968 | Anthony et al. | ............. 446/397 |
| 3,927,490 A | * 12/1975 | Grayson | ..................... 446/397 |
| 4,041,639 A | * 8/1977 | Funk | ............................ 446/397 |
| 4,343,108 A | 8/1982 | Lee | |
| 4,387,531 A | * 6/1983 | Jacob | ........................... 446/397 |
| 4,418,025 A | * 11/1983 | Prochazka et al. | .......... 264/1.21 |
| 4,586,912 A | * 5/1986 | Adams | ........................ 446/397 |
| 4,662,858 A | 5/1987 | Hall | |
| 4,664,641 A | 5/1987 | Hearn et al. | |
| 4,932,920 A | * 6/1990 | Hearn | .......................... 446/397 |
| 4,955,845 A | 9/1990 | Piper | |
| 5,066,260 A | 11/1991 | Lindler | |
| 5,380,235 A | 1/1995 | Forbes et al. | |
| 6,149,492 A | 11/2000 | Davis | |
| 6,168,493 B1 | * 1/2001 | Kirby | .......................... 446/418 |
| 6,540,582 B1 | * 4/2003 | Primos et al. | ............... 446/418 |

* cited by examiner

Primary Examiner—Derris H. Banks
Assistant Examiner—Faye Francis
(74) Attorney, Agent, or Firm—Mark Rogers; Gary N. Speed

(57) ABSTRACT

A game call friction material is disclosed. Airfloated clay powder is heated to a temperature of greater than approximately 1112° F. to form a calcined clay powder that is then mixed with water and a carrier such as plaster and set to form a solid mass. The volume ratio of plaster to calcined clay in the solid mass is approximately 150:1. The solid mass preferably has a cavity with a second mass of calcined clay and plaster disposed therein. The volume ratio of calcined clay to plaster in the second mass is approximately 3:1. The solid mass is rubbed against a friction game call, depositing calcined clay particles and plaster particles thereon. The calcined clay particles form friction layers on the relevant surfaces of the friction game calls. The plaster helps to dry the friction game call surfaces and to form the friction layers on the friction game call surfaces.

8 Claims, 6 Drawing Sheets

GAME CALL FRICTION MATERIAL

BACKGROUND OF THE INVENTION

The present invention relates generally to hunting game calls that rely on friction to produce game sounds. More particularly, this invention relates to friction producing material that is applied to the working surfaces of these calls to enable these calls to produce the desired game sounds.

Chalk is described in the prior art as a common requirement for the proper function of game calls that depend on friction to produce game sounds. Prior art suggests that one should apply chalk in liberal amounts to the working surfaces of the call. A few examples of friction game calls and examples of how chalk is used in connection with them are give in the following patents: U.S. Pat. No. 574,534 (Gibson), U.S. Pat. No. 4,343,108 (Lee), U.S. Pat. No. 4,662,858 (Hall), U.S. Pat. No. 4,664,641 (Hearn et al.), U.S. Pat. No. 4,955,845 (Piper), U.S. Pat. No. 5,066,260 (Lindler), and U.S. Pat. No. 5,380,235 (Forbes et al.). The disclosures of these patents are incorporated herein by reference as if fully set forth. These examples reveal a time frame for the use of chalk dating from 1897 until modern time. One would expect that thousands of these game calls could be found in use today, and any improvement on chalk would be welcome to the users of these game calls.

Chalk is typically an artificially prepared pure calcium carbonate, and is a variety of limestone that is composed almost entirely of calcite. Chalk is typically a soft limestone and can be ground by hand. It is typically formed from deposited calcareous mud and hence is extremely fine in texture. In a dry state chalk particles are packed close together and the chalk object is a solid. In this state the particles produce friction as they slide against one another. This friction produces sound when it is compressed and rubbed between two pieces of wood such as that employed in a friction game call. Chalk offers a number of advantages and works well under the some conditions. Still, using chalk with a friction game call has a number of disadvantages. For example, one major disadvantage of using chalk as a friction material for friction game calls is that chalk typically performs poorly or not at all in wet conditions. Water acts as a lubricant between the chalk particles. If there is plenty of water, such as on a rainy day, the chalk particles can slide past one another without difficulty. In such a case, there is not enough friction to produce sound when working a game call. Therefore, a friction game call typically cannot be used on a rainy day when chalk is used.

The use of rosin (from resin) of the kind used on violin bows was not overlooked by "turn of the century" friction game call users and even call users today. Both rosin (a hard resin left after distilling off the volatile oil of turpentine) and resin (from plant origin) have been used as a friction producing material on wooden friction game calls. Mainly in order to improve their use during rainy and wet conditions. Both are soluble in organic solvents but not in water. Both are sticky and objectionable for use by most users that care about preserving the good condition and appearance of their wooden friction game calls. Organic solvents are sometimes employed to thin these materials so that they can be painted on the wooden surfaces in liquid form. It is possible for these solvents to cause wood to crack or split much as water would. For these reasons, the use of rosin or resin material on wooden friction game calls has been very limited and not widely accepted by owners of these calls.

In U.S. Pat. No. 6,149,492 (Davis), a ceramic bisque disc attached to a vane is described. The disclosure of this patent is incorporated herein by reference as if fully set forth. A wooden striker end is rubbed endwise against the surface of this disc to produce friction that results in sound vibrations that resemble game sounds. This call will work in the rain. However, this hard ceramic bisque disc must be sanded often in order to work as does disc materials such as slate, glass, aluminum, etc. that do not work in the rain or when they become slick from handling. A wooden striker end that has embedded particles from rubbing against a ceramic bisque disc will typically retain it's wet friction working capability for only a few short strokes when rubbed against a disc made of other slate like materials. Particles from these other materials would rapidly cover over or top off the hard ceramic particles embedded in the striker end and the calls would cease to work wet. Regardless of whether the striking surface of a peg and slate type call is composed of slate, glass, aluminum, or similar materials, peg and slate type game calls in use today are typically without wet working and slick working capability when the much preferred wooden strikers are employed. The same is true for glass and aluminum calls when wooden strikers are used.

Further still, a hunter will typically have plenty of other gear to buy and to carry while hunting. It is therefore undesirable for a hunter to have to buy and carry different chalks, boxes, striker rods or pegs, or striking surfaces to use depending upon possible changes in weather conditions.

SUMMARY OF THE INVENTION

It is therefore an object of the present invention to provide a chalk-like friction material and a method of making and using the same for use in connection with a wide variety of friction game calls under a wide variety of conditions.

It is a further object of the present invention to provide a friction material of the above type that works well when wet.

It is a further object of the present invention to provide a friction material of the above type that can deliver a superior friction layer for overlaying the surface of existing friction game calls.

It is a further object of the present invention to provide a friction material of the above type that can deliver a superior friction layer ideally suited for existing striker pegs of peg and slate type friction game calls.

It is a still further object of the present invention to provide a friction material of the above type that, when delivered to a non-friction surface, will tend to cling to that surface to form a thin friction layer.

It is a still further object of the present invention to provide a friction material of the above type that will allow friction surfaces of a existing slate type calls to be replaced with non-friction surfaces.

It is a still further object of the present invention to provide a friction material of the above type that provides friction even when it friction surfaces become slick from being handled with the hands or from being rubbed against clothing as they are being carried.

It is a still further object of the present invention to provide a friction material of the above type that provides friction for game calls when they become damp or wet from being exposed to fog or rain when in use.

It is a still further object of the present invention to provide a friction material of the above type that can be used in all weather conditions for all game calls that rely on friction for producing game sounds.

It is a still further object of the present invention to provide a friction material of the above type that is inexpensive, easy to carry, easy to use, and easy to manufacture.

It is a still further object of the present invention to provide a friction material of the above type that provides different compositions or concentrations of materials in a single, easy to carry and store device.

It is a still further object of the present invention to provide a friction material of the above type that eliminates the need to buy or carry different components or parts for using friction game calls in different conditions.

Toward the fulfillment of these and other objects and advantages, a game call friction material is disclosed. Airfloated clay powder is heated to a temperature of greater than approximately 1112° F. to form a calcined clay powder that is then mixed with water and a carrier such as plaster and set to form a solid mass. The volume ratio of plaster to calcined clay in the solid mass is approximately 150:1. The solid mass preferably has a cavity with a second mass of calcined clay and plaster disposed therein. The volume ratio of calcined clay to plaster in the second mass is approximately 3:1. The solid mass is rubbed against a friction game call, depositing calcined clay particles and plaster particles thereon. The calcined clay particles form friction layers on the relevant surfaces of the friction game calls. The plaster helps to dry the friction game call surfaces and to form the friction layers on the friction game call surfaces.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
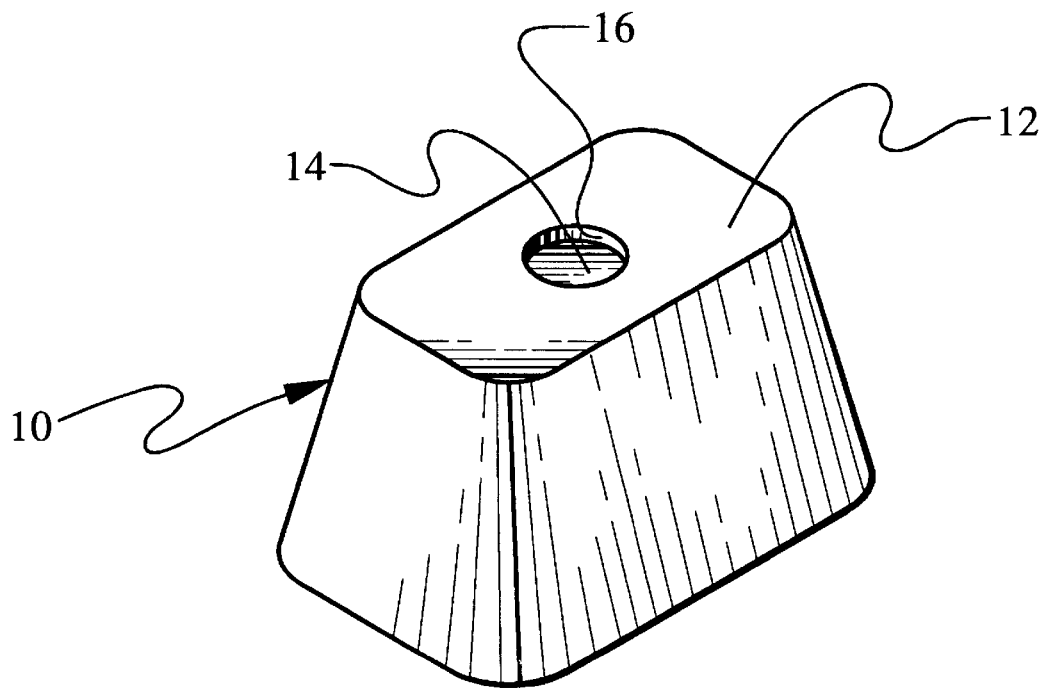
FIG. 1 is a perspective view of a friction material block of the present invention.
Figure 2:
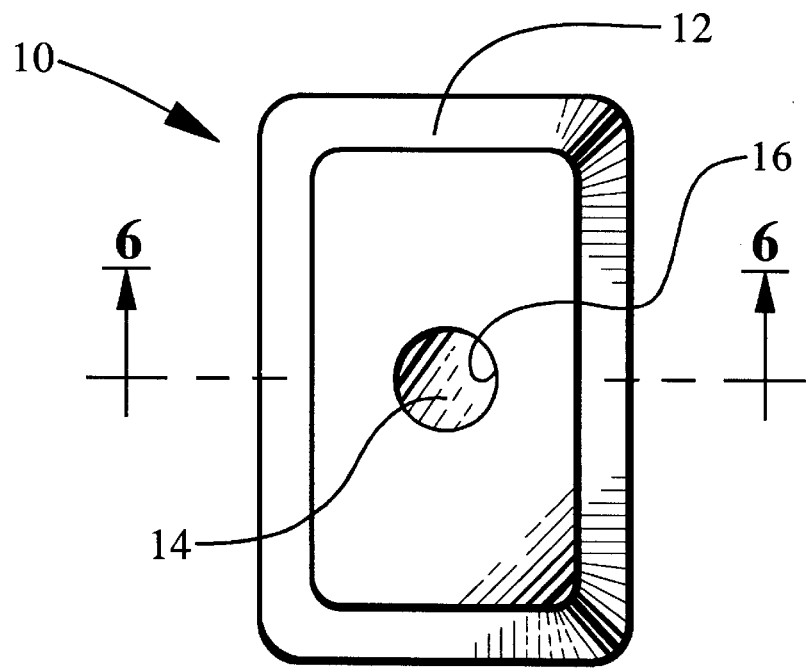
FIG. 2 is an overhead view of the block depicted in FIG. 1.
Figure 3:
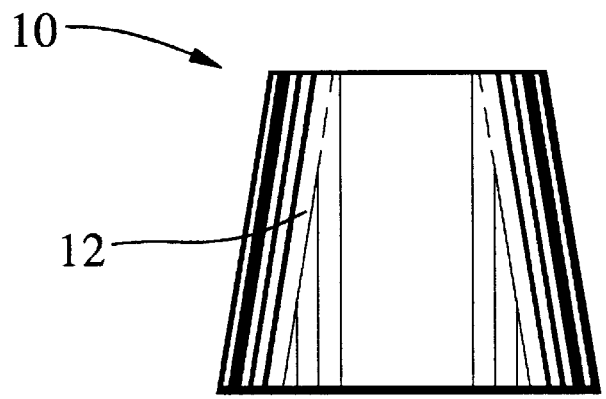
FIG. 3 is a side elevation view of the block depicted in FIG. 1.
Figure 4:
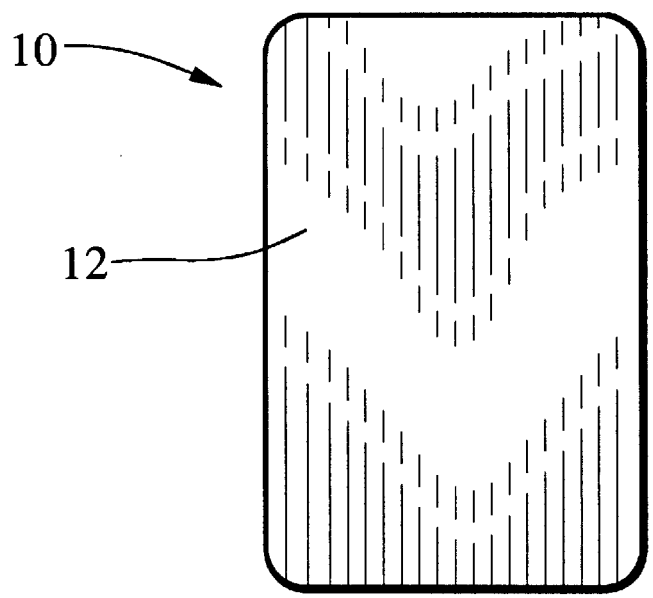
FIG. 4 is a bottom view of the block depicted in FIG. 1.
Figure 5:
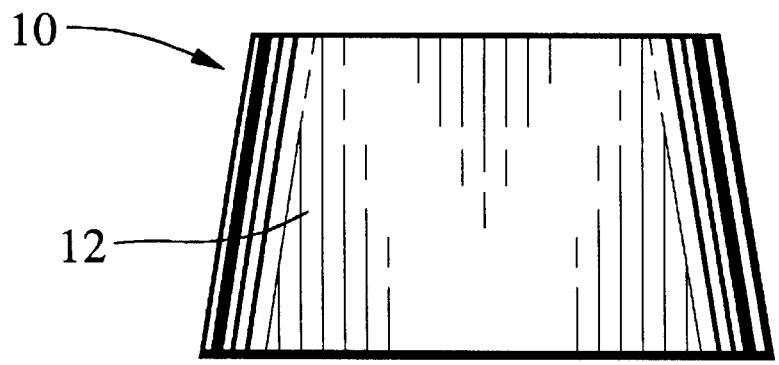
FIG. 5 is a front elevation view of the block depicted in FIG. 1.

Referring to FIG. 1, the reference numeral 10 refers in general a block of friction material of the present invention. The block 10 includes a base material 12 having one composition and a core material 14, disposed in a cavity 16 of the block 10, having a second composition.

One starting material is a powder. The powder is preferably an aluminosilicate or clay powder, is more preferably an airfloated clay powder, and is most preferably airfloated Redart™ clay powder. This clay powder is the exclusive property of the Cedar Heights Clay Company, Division RESCO Products, Inc. Norristown, PA. Redart™ is a trademark used by this company. The mineralogical structure of this Redart™ brand clay powder is reported by the company as follows: Illite 40%, Kaolinite 10%, Free Quartz 30%, Mixed Layered Clays 15%, and Red iron 7%. Although the most preferred clay powder has the above composition, it is understood that a wide variety of powders, particularly powders made from various clays may be used. Clay is typically a natural, earthy, fine-grained material that develops plasticity when mixed with a limited amount of water. Clay is typically composed primarily of silica, alumina, and water, often with iron, alkalies, alkanline earths, and any number of different minerals. Clay is typically considered an aluminosilicate or a hydrated aluminosilicate and is often represented by a formula such as $(Al_2O_3.2SiO_2.2H_2O)$. It is of course understood that as used herein the term clay is not limited to this representative formula. Clay is generally a fine-grained rock formed by a geological weathering process acting on granites and other rock masses. As such, it can be appreciated that clay does not have any one particular composition. In the preferred embodiment, clay is ground to provide coarse clay particles, and the coarse clay particles are airfloated to obtain fine clay particles or powder. It is understood that clay powder may be obtained by grinding alone and that, although preferred, airfloating is not required.

Another starting material is a carrier, preferably plaster, and more preferably plaster of Paris. Plaster is a mixture of various particles, such as lime, gypsum, or sand, sometimes with hair or other fiber added, which when mixed with water forms a plastic mixture that sets to a hard, coherent solid. Plaster of Paris is a powder consisting primarily of the hemihydrate of calcium sulfate $(CaSO_4.\frac{1}{2}H_2O$ or $2CaSO_4.H_2O)$, produced by calcining gypsum until it is partially dehydrated. The preferred plaster of Paris material is "#1 Pottery Plaster" from American Art Clay Co., Inc. Indianapolis, Indiana. Although plaster, and particularly plaster of Paris is the preferred carrier, it is understood that any number of different substances may be used as a carrier, including but not limited to chalk or plastics such as styrene plastic.

To prepare the friction material of the present invention, clay powder is calcined or heated to a high temperature without fusing so as to drive off volatile materials and harden the particles. In the preferred embodiment, the clay powder is calcined by kiln heating above approximately 1112° Fahrenheit in order to subject it to a "ceramic change." The clay powder is preferably fired at cone 4, but can be fired in a long firing range of cones. When fired at cone 4 the resulting calcined clay powder has a "medium brick red" color. Firing at this temperature changes the powder to a hard, bonded aluminosilicate material, often referred to as metakaolin $(Al_2O_3.2SiO_2)$, that cannot be disintegrated by water. It is preferred that the calcining be conducted so that the calcined clay powder remains in powder form. In particular, it is preferred to avoid fusing or the formation of a bisque disc. It is of course understood that the temperature and length of time required to calcine the powder will vary depending upon the composition and characteristics of the particular powder.

The calcined clay powder is then mixed with the plaster, and the mixture is sprinkled into a suitable volume of water and stirred until a consistency compared to that of pancake batter is reached. The resulting mix is poured into a casting mold of the preferred shape that provides a hollow core area or cavity 16 within the center of the block 10 and allowed to set up to a hardened state. The ratio of plaster to calcined clay powder may be varied widely depending upon the desired characteristics of the resulting product, and the selection is a balancing act. Higher concentrations of the calcined clay powder will generally provide for better calling performance, particularly on peg and slate type 20 friction game calls, but higher concentrations of the calcined clay powder also tend to render the resulting solid more brittle. Higher concentrations of the plaster will generally provide for better drying and wicking performance that can be particularly useful in connection with box-type 30 friction game calls. Higher concentrations of the plaster also tend to render the resulting solid less brittle and more durable. Still, plaster is generally inferior to calcined clay powder for producing friction and therefore sound with a friction game call, and plaster can be washed away relatively quickly in wet conditions. It can be a balancing act to decide upon the mix of plaster and calcined clay powder that provides the right combination of such things like performance and durability.

Figure 6:
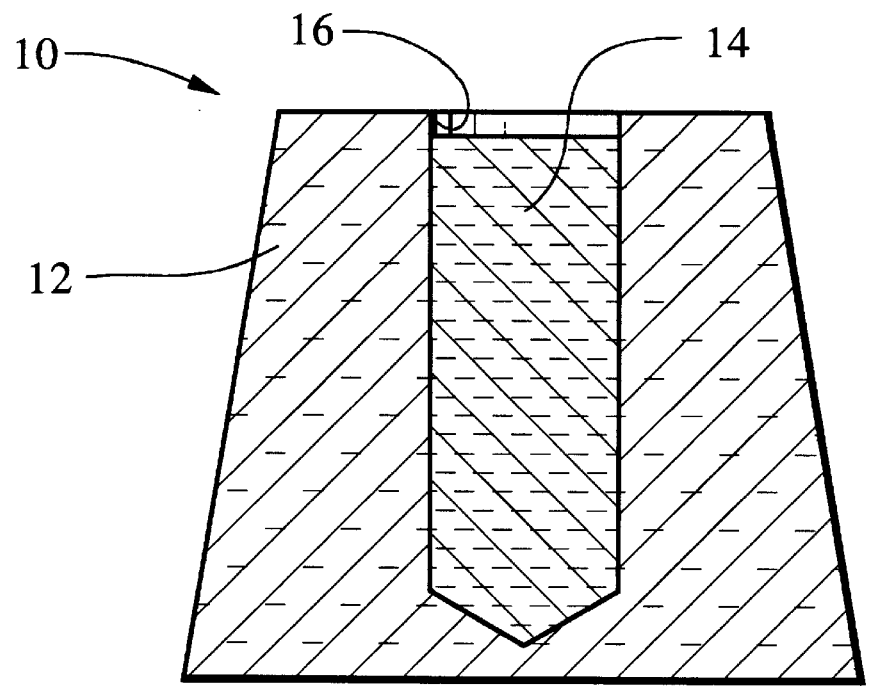
FIG. 6 is a sectional view taken along line 6—6 of FIG. 2.

The present invention also provides a novel configuration to offer a more versatile product that can deliver both performance and durability in a single, easily carried block 10. In that regard, the present invention offers a single block 10 capable of providing both improved durability and improved performance. As best seen in FIG. 6, the base material 12 has a cavity 16 formed therein and serves as a container for the core material 14. In this way, a more durable composition may be selected for the base material 12, and a more brittle composition, having a higher concentration of the calcined clay powder, may be selected for the core material 14. The cavity 16 may take any number of different shapes, sizes, and configurations, and more than one cavity 16 may be provided. In the preferred embodiment, the cavity 16 is generally cylindrical with a circular opening sized to permit most standard size striker pegs 18 to fit therein. It is of course understood that any number of different compositions may be combined in a single block 10. It is also understood that the block 10 not only may include friction material having calcined clay powder but also may include conventional chalks and the like. This eliminates the need to carry additional blocks of friction material, additional friction game calls, or additional striker pegs 18 to handle different combinations of wet and dry conditions.

In the preferred embodiment, friction material having two different compositions is used. It is understood that the phrase "different compositions" is intended to include compositions having different constituent components as well as compositions having the same constituent components in different concentrations. As discussed below, the mixing ratios of plaster to calcined clay powder are based on parts of equal volume and fractions thereof. Accordingly, the ratios discussed below are volume ratios. The volume ratio of plaster to calcined clay in the base material 12 is within a range of from approximately 1 part plaster to 1 part calcined clay powder to approximately 300 parts plaster to 1 part calcined clay powder. The volume ratio of plaster to calcined clay in the base material 12 is preferably greater than or equal to approximately 50:1, is more preferably greater than or equal to approximately 100:1, and is most preferably approximately 150:1. This composition provides a high degree of durability and provides for superior drying capabilities while still providing acceptable amounts of the calcined clay powder.

Figure 7:
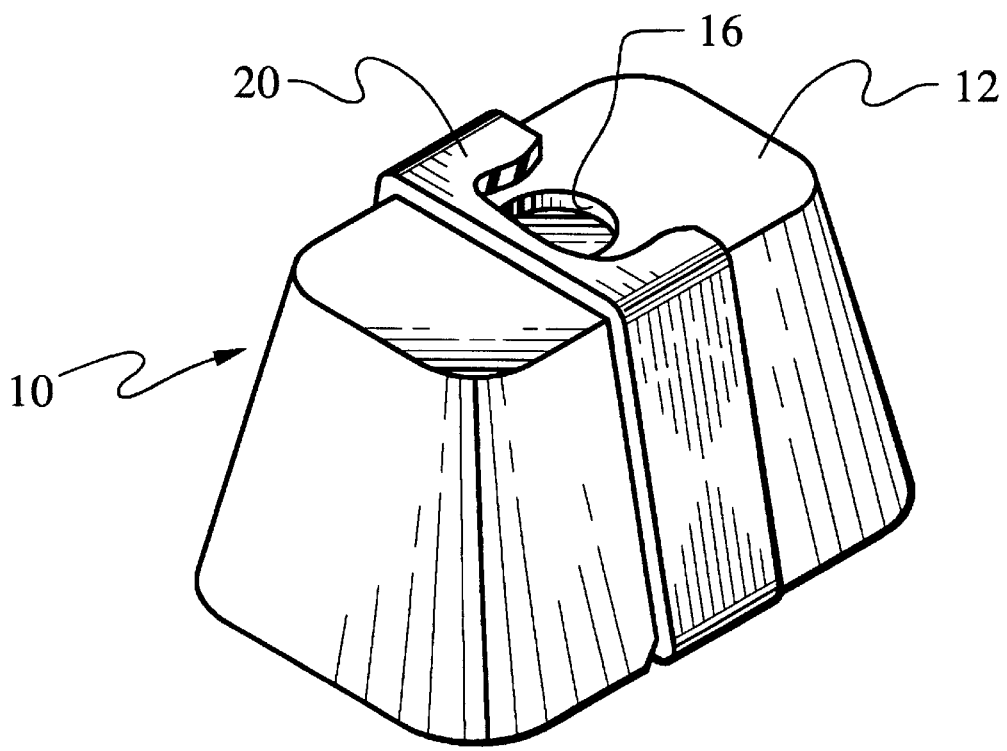
FIG. 7 is a perspective view of an alternate embodiment of the present invention.

After the base material 12 dries and is removed from the mold; a second mix, with a higher concentration of calcined clay powder, is added to water, mixed, and poured into the cavity 16 or hollow core area of the base 12 and allowed to set hard. In this respect, the base 12 becomes a mold for the second mix, referred to as the core mix 14. This core mix 14 can range from ¼ part plaster to 3 parts calcined clay powder to a 50/50 mix. The preferred core mix 14 is 1 part plaster to 3 parts calcined clay powder. In that regard, the core mix 14 has a volume ratio of calcined clay powder to plaster that is preferably approximately 1:1 and that is more preferably approximately 3:1. Experiments with peg and slate type 20 friction game calls and the like have shown that improved friction is achieved by mixing only a small ratio of plaster of Paris to calcined clay powder. Only enough is used to bond the powder together when water is added and the plaster dries and sets up. This "core mix" is configured within the cavity 16 or center part of the block 10, with the cavity 16 being sized to accept a wooden striker peg 18 endwise. This composition is relatively brittle, so it is preferred to have it encased by the base material 12. Still, the high concentration of calcined clay powder provides for excellent performance characteristics, particularly in wet conditions. While it is preferred to include some plaster or other carrier in the core material 14 and to set the core material 14 into the form of a solid mass, this is not required. As depicted in the alternate embodiment of FIG. 7, the cavity 16 of the block 10 may be filled with a calcined clay powder, or the like, in powder form. If the cavity 16 is filled with a powder, the cavity 16 is preferably covered, such as by using an elastic band 20, for example a rubber band, as shown. Once prepared, the resultant block 10 is a small, basically cube-shaped mass of molded friction producing material that is easy to carry and easy to apply to the surface of various kinds of friction game calls.

Figure 8:
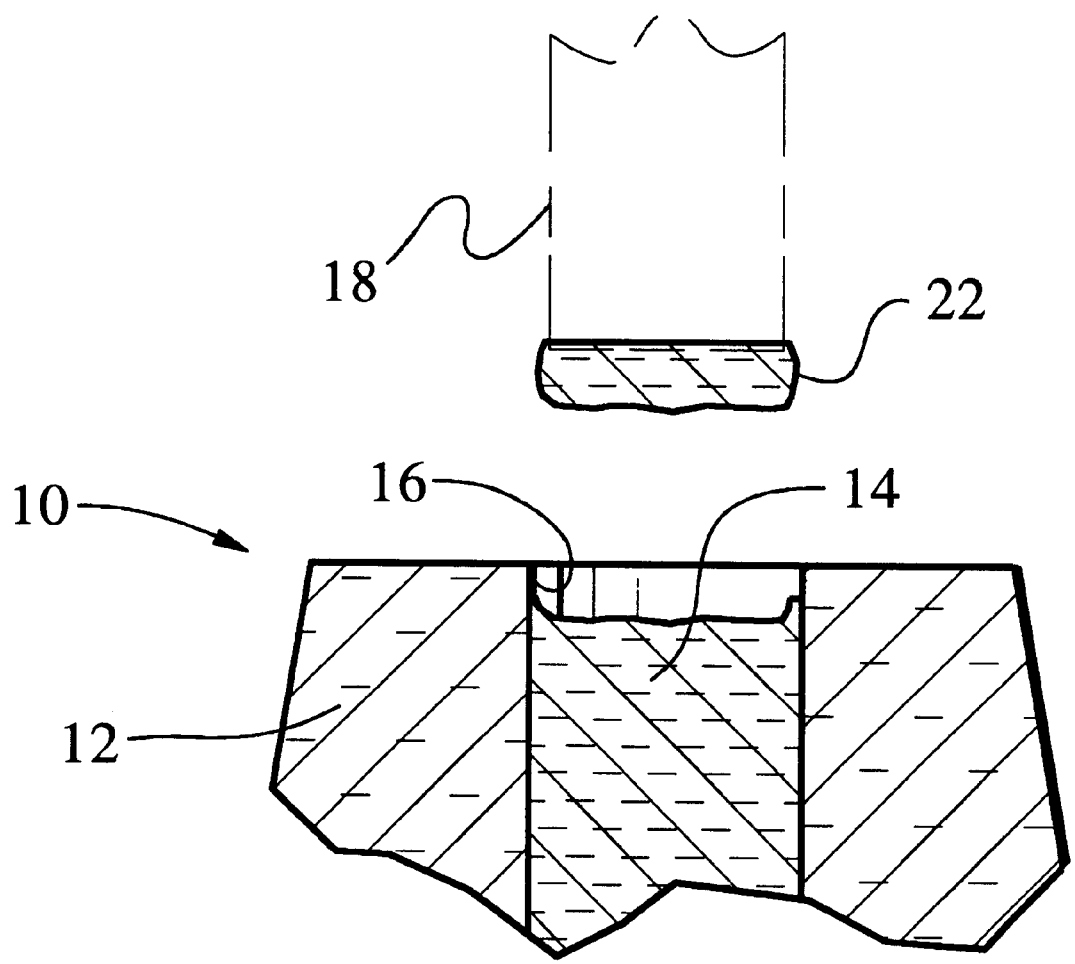
FIG. 8 is a section view similar to FIG. 6 and showing the block being used in connection with a striker peg of a peg and slate type friction game call.
Figure 9:
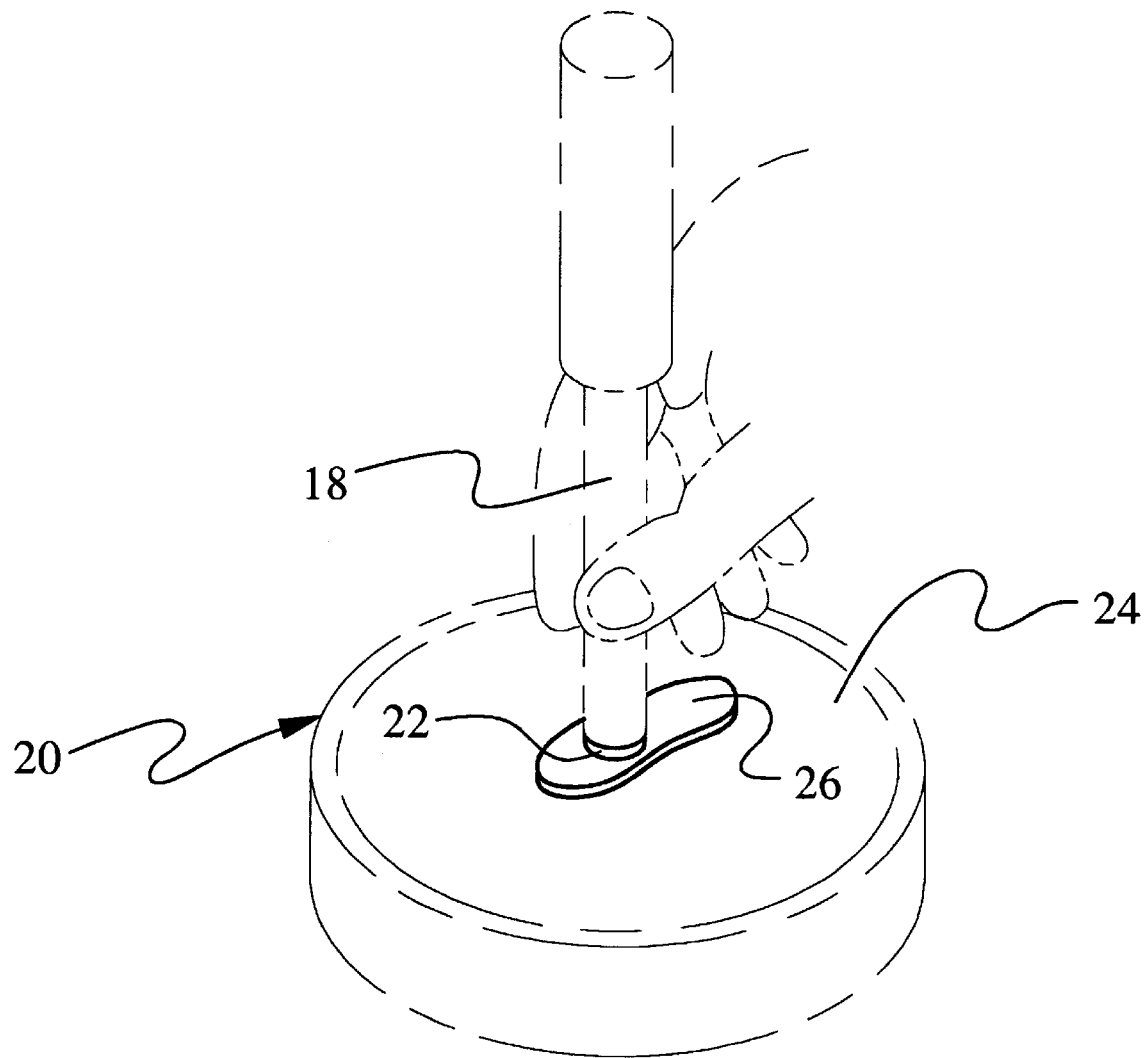
FIG. 9 is a perspective view showing the friction material of the present invention being used in connection with a peg and slate type friction game call.
Figure 10:
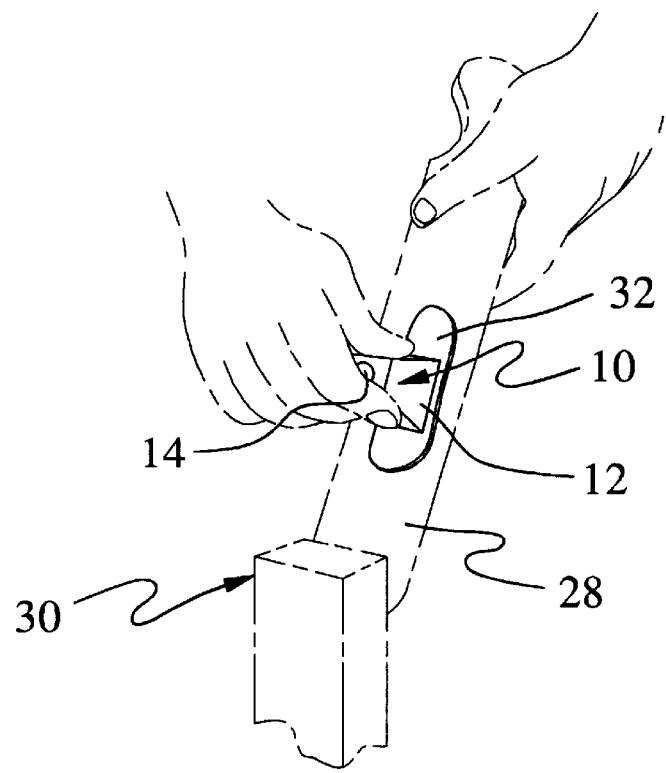
FIGS. 10 and 11 are perspective views of the block of FIG. 1 being used in connection with a box-type friction game call.
Figure 11:
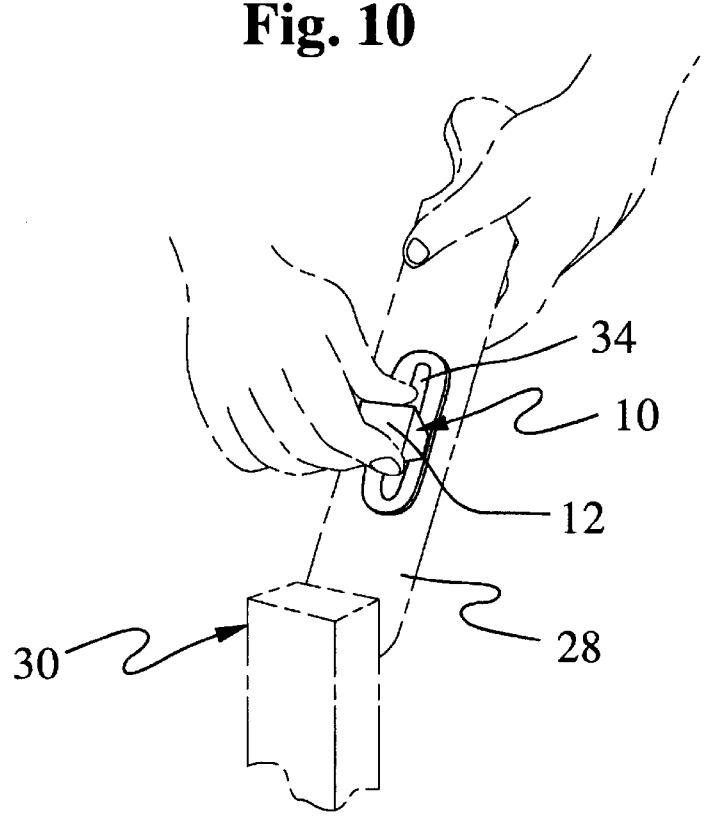

Referring to FIGS. 8, 10, and 11, in operation, a user will rub the desired region or regions of the block 10 against the appropriate part of a friction game call to apply the friction material to the friction game call. As best seen in FIG. 8, when using a peg and slate type 20 friction game call, a user will typically moisten the end of the peg 18 and rub the moistened end of the peg 18 against the core material 14. As the core mix 14 is used, this may involve inserting the peg 18 into the cavity 16, so the cavity 16 is sized to allow most standard peg 18 sizes to fit therein. A friction layer 22 of the core mix 14 is deposited on the end of the peg 18. As seen in FIG. 9, as the peg 18 is rubbed on the striking surface 24, a portion of the friction material remains on the peg 18 to remain as the friction layer 22 on the peg 18, and a portion of the friction material is transferred to the striking surface 24 to form a friction layer 26 on the striking surface 24. The plaster helps the calcined clay powder cling to the peg 18 and the striking surface 24 and allows the friction game call to create the desired sounds for a longer period of time.

This process sets up a unique condition that heretofore has not been described in the art. These separate friction layers 22 and 26 of core mix 14 now work against each other to provide friction sounds independent of the underlying material 24. Because the underlying material 24 is not relied upon for providing a friction surface, the underlying material 24 functions primarily to support the overlying friction material and to transfer friction sounds to the sound chamber within the body of the call. It is now irrelevant whether the planar surface or striking surface 24 is frictional in nature, and it is therefore irrelevant whether the striking surface 24 is slate, glass, crystal, aluminum, ceramic, or even wood. Any number of such surfaces will work even when slick or wet.

Almost any hard material can now be used as the striking surface 24 of a peg and slate type 20 call if it is to be used in conjunction with this unique friction delivery system.

Highly decorative non-frictional surfaces may now be employed in the place of the old friction type surfaces used in prior art friction game calls.

Similarly, as shown in FIGS. 10 and 11, the block 10 may be rubbed against the lid 28 of a box-type 30 friction game call. The region of the block 10 that is rubbed against the lid 28 is determined by weather conditions and desired capabilities. For example, as seen in FIG. 10, a portion of the base material 12 may be rubbed against the lid 28 to deposit a friction layer 32 of only the base material 12. This might be done in humid conditions in which the drying capabilities of the plaster are desired but in which the wet weather capabilities of the calcined clay powder may not be needed. This also helps to conserve the more expensive core material 14, until it is really needed. As seen in FIG. 11, in wet conditions, the top of the block 10 may be rubbed against the lid 28 to deposit a friction layer 34 that includes both the base material 12 and the core material 14. The added amount of the calcined clay powder will provide improved sounding capabilities in wet conditions, and the extra plaster from the base material 12 will help the calcined clay powder cling to the lid 28 as it is spread over the lid 28 surface when the lid is rubbed from side to side against the sounding walls of the box call 30.

The calcined clay powder is primarily responsible for the friction and resulting sound produced in wet conditions, but the plaster also serves a number of useful functions. For example, the plaster serves to quick dry the working surfaces of wooden game calls that have become dampened by rain or other atmospheric conditions. Plaster in the block 10 provides up to 40% absorbency. When rubbed onto the wet lid 28 of a typical wooden box call 30, of the type used to call turkeys, the function of the call can be restored within a short period of time, typically within 60 seconds. Tests reveal not only that moisture is quickly drawn from the pores of the wood by the plaster coating but also that the moisture is rapidly evaporated from the plaster coating. Plaster in the block 10 also works like cement to suspend the fine particles of calcined clay powder in even distribution throughout the block 10. The fine, hard, insoluble particles of calcined clay powder become free to accumulate and work into the working surfaces of the wood as the working pressure of the wooden parts crush and wipe off the surrounding softer plaster material. These functions work together to provide friction for wet or slick wooden game calls and to improve sounds produced when these calls are used in the normal dry fashion. Call users will appreciate the fact that these materials, working together, enhance the function of their call without damaging the surface or adversely altering the appearance of their prized wooden game calls.

The present invention provides a conglomerate of materials formed into a solid mass that resembles chalk in appearance and consistency, something that most call users will accept and apply to their friction calls. Unlike prior art chalk, the friction material of the present invention functions well in wet and dry conditions. The block 10 of the present invention also has different regions having different compositions for greater flexibility in providing optimal performance when used in connection with a broad range of friction game calls and when used in a wide variety of weather conditions. No single friction material can solve the multitude of problems that might be encountered with an acceptable degree of efficiency. By providing two or more different regions having two or more different compositions, the block 10 is better able to deal with the wide range of friction problems that might be encountered. In that regard, each material in the conglomerate may target a different set of problems, adding flexibility to the block 10. In this manner, the present invention overcomes a number of the limitations inherent in using prior art chalk in connection with friction game calls. The friction material of the present invention may be used in connection with any number of different friction game calls, including but not limited to box-type 30 calls, peg and slate type 20 calls, and the like. This is true whether the striking surface 24 of the peg and slate type 20 call is made from slate, a ceramic bisque disc, glass, aluminum, or the like.

Other modifications, changes and substitutions are intended in the foregoing, and in some instances, some features of the invention will be employed without a corresponding use of other features. For example, although the preferred embodiment takes the form of a block 10, it is understood that the calcined clay powder may be supplied in powder form. It is also understood that any number of different delivery mechanisms may be used for applying calcined clay powder to a friction game call. Further, although the preferred block 10 includes two different compositions, it is understood that a block 10 may have only one composition or may have any number of additional different compositions. Similarly, although the preferred embodiment involves a base material 12 with a cavity 16 for storing a core material 14, it is understood that the different compositions may be disposed in any number of different arrangements, configurations, sizes, and the like. Of course, quantitative information is included by way of example only and is not intended as a limitation as to the scope of the invention. Accordingly, it is appropriate that the invention be construed broadly and in a manner consistent with the scope of the invention disclosed.

What is claimed is:

1. A method, comprising:
  (1) providing a powder;
  (2) heating said powder to a temperature that is greater than or equal to approximately 1112° F. to form a calcined powder; and
  (3) applying said calcined powder to a friction game call.

2. The method of claim 1, wherein step (1) comprises providing a first clay powder.

3. The method of claim 1, wherein step (1) comprises providing an aluminosilicate powder.

4. The method of claim 1, wherein step (1) comprises providing a powder comprising illite, kaolinite, quartz, and iron.

5. The method of claim 1, wherein said powder comprises a fine clay powder, and wherein step (1) comprises:
  providing clay;
  grinding said clay to provide coarse clay particles; and
  airfloating said coarse clay particles to provide said fine clay powder.

6. The method of claim 2, wherein said calcined powder comprises a first calcined clay powder, and further comprising:
  before step (3), adding a carrier to said first calcined clay powder and forming a solid mass, said solid mass comprising said carrier and said first calcined clay powder.

7. The method of claim 2, wherein said calcined powder comprises a first calcined clay powder, and at further comprising:
  before step (3), adding a first plaster and water to said first calcined clay powder and setting said first plaster, said water, and said first calcined clay powder to form a solid mass, said solid mass comprising said first plaster and said first calcined clay powder.

8. The method of claim 7, wherein said first plaster is present in said solid mass in a volume ratio relative to said first calcined clay powder that is greater than or equal to approximately 100:1; and further comprising:

before step (3), providing a cavity in said solid mass; and providing a second mass in said solid mass, said second mass comprising a second plaster and a second calcined clay powder, said second calcined clay powder being present in said second mass in a volume ratio relative to said second plaster that is greater than or equal to approximately 1:1.

* * * * *